United States Patent Office 3,804,854
Patented Apr. 16, 1974

3,804,854
5,5-DIPHENYL-2-PYRROLIDINONE COMPOUNDS
Bernard Loev, Broomall, Pa., assignor to Smithkline Corporation, Philadelphia, Pa.
No Drawing. Filed Oct. 14, 1971, Ser. No. 189,333
Int. Cl. C07d 27/08
U.S. Cl. 260—326.5 FL
8 Claims

ABSTRACT OF THE DISCLOSURE 5,5-diphenyl-2-pyrrolidinones optionally having a 1-hydroxy or 1-lower alkoxy substituent are prepared by cyclizing a diphenylbutenamide or the 1-hydroxy or 1-lower alkoxy derivative thereof. These 5,5-diphenyl-2-pyrrolidinones have coronary vasodilator activity.

---

This invention relates to new 5,5-diphenyl-2-pyrrolidinone compounds having pharmacodynamic activity. In particular, these compounds have coronary vasodilator activity. This activity is demonstrated by administration to anesthetized dogs at doses of about 1 to 5 mg./kg. intravenously.

In addition, this invention relates to a process for preparing 5,5-diphenyl-2-pyrrolidinones.

The 5,5-diphenyl-2-pyrrolidinone compounds of this invention are represented by the following formula:

FORMULA I

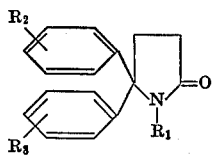

in which:

$R_1$ is hydrogen, hydroxy or lower alkoxy and
$R_2$ and $R_3$ are hydrogen, halogen, lower alkyl, lower alkoxy or trifluoromethyl.

Preferred compounds are represented by Formula I in which $R_1$ is lower alkoxy. An advantageous compound of this invention is 1-methoxy-5,5-diphenyl-2-pyrrolidinone.

The 5,5-diphenyl-2-pyrrolidinones of this invention are prepared by the following process which is also an object of this invention.

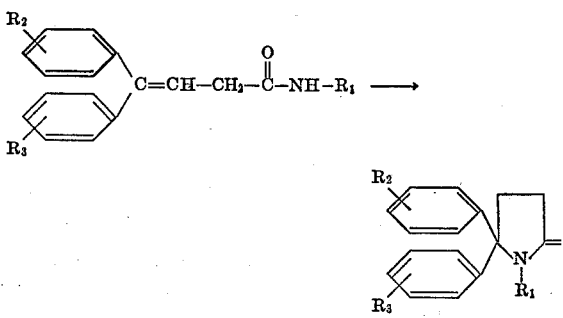

The terms $R_1$, $R_2$ and $R_3$ are as defined above.

According to the above procedure, a 4,4-diphenyl-3-butenamide is cyclized by treating with acid, such as a sulfonic acid, hydrochloric acid, trifluoroacetic acid or phosphoric acid or, for example, to prepare the compounds in which $R_1$ is hydrogen, polyphosphoric acid at elevated temperature may be used or, to prepare the compounds in which $R_1$ is hydroxy, concentrated sulfuric acid at room temperature is preferred. An excess of the acid or a solvent such as benzene, toluene or ether may be used.

Alternatively, the compounds of Formula I in which $R_1$ is lower alkoxy are prepared by alkylating the corresponding compound in which $R_1$ is hydroxy, for example by treating the hydroxy compound with an alkylating agent such as a lower alkyl halide.

The 1-unsubstituted 5,5-diphenyl-2-pyrrolidinones may also be prepared by catalytic reduction of the corresponding 1-hydroxy or 1-lower alkoxy compounds.

The 4,4-diphenyl-3-butenamide starting materials are prepared as follows:

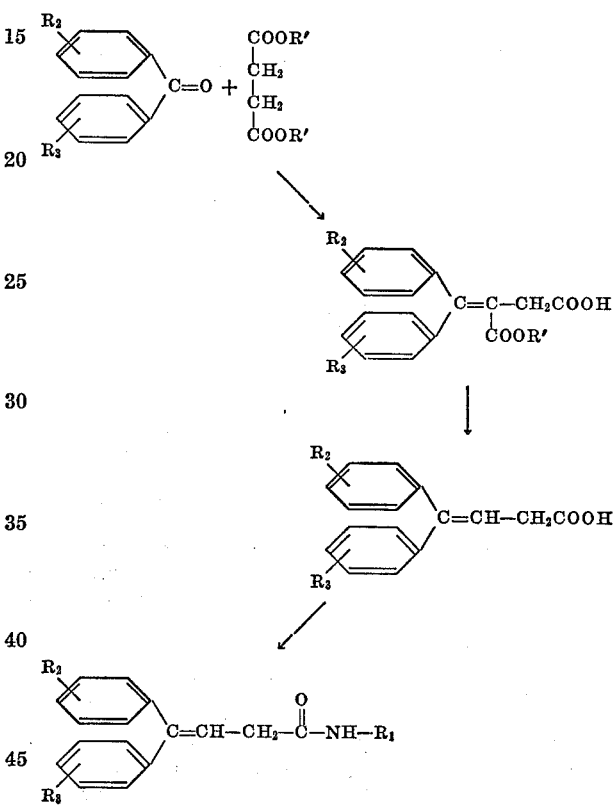

The terms $R_1$, $R_2$ and $R_3$ are as defined above and R' is methyl or ethyl.

According to the above procedure, a benzophenone is reacted with a succinic acid ester in the presence of a base (the Stobbe reaction) and the resulting 3-carbalkoxy-4,4-diphenyl-3-butenoic acid is treated with acid such as hydrobromic acid in aqueous acetic acid. The resulting 4,4-diphenyl-3-butenoic acid is converted to the acid chloride by treating with thionyl chloride or to an ester such as the phenyl ester and the acid chloride or phenyl ester is reacted with ammonia, hydroxylamine or a O-lower alkylhydroxylamine to give the 4,4-diphenyl-3-butenamide starting materials.

Alternatively, the butenoic acids may be prepared from an ester prepared via the well known Wittig reaction or analogous procedures:

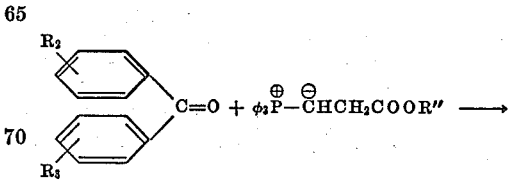

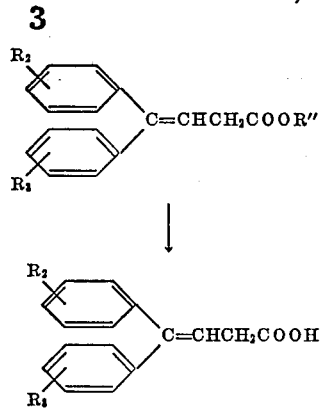

The terms $R_2$ and $R_3$ are as defined above and $R''$ is methyl or ethyl.

Also, the butenoic acids may be prepared by condensation of the appropriate aldehyde with malonic acid in the presence of a basic catalyst:

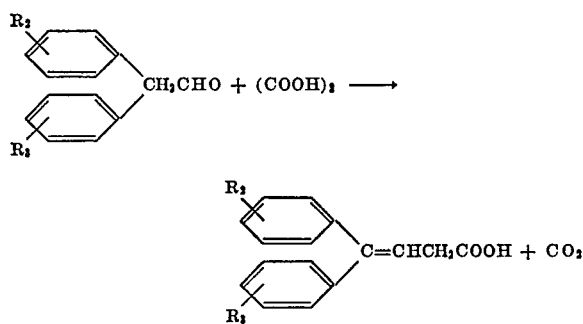

The terms $R_2$ and $R_3$ are as defined above.

The butenamides and butenoic acids, prepared as described above, are written herein as having the double bond at the 3-position. However, under some conditions, these butenamide and butenoic acid compounds may have the double bond at the 2-position. Both the 2- and 3-butenamides give the same pyrrolidinone products in the process of this invention.

The compounds of this invention may be combined with pharmaceutical carriers according to accepted pharmaceutical practices to form pharmaceutical compositions.

The terms "lower alkyl" and "lower alkoxy" where used herein denote groups having 1 to 4 carbon atoms and the term "halogen" denotes chloro, bromo or fluoro.

The following examples are not limiting but are illustrative of the invention.

EXAMPLE 1

Twenty grams of 4,4-diphenyl-3-butenoic acid is dissolved in 250 ml. of thionyl chloride and the resulting solution is heated at reflux for 20 minutes, then concentrated and dissolved in 100 ml. of ether. The resulting solution is added slowly with stirring to 400 ml. of cold concentrated ammonium hydroxide. The mixture is stirred for 10–15 minutes and then warmed to evaporate off the ether, then cooled by adding ice water, stirred and filtered. The resulting solid material is dried and recrystallized from isopropanol-ethanol to give 4,4-diphenyl-3-butenamide.

Polyphosphoric acid (200 ml.) heated to 165° C. is added to 6.0 g. of 4,4-diphenyl-3-butenamide with stirring. The mixture is allowed to cool with stirring to 150–155° C. and kept at that temperature for 10 minutes. The mixture is then cooled to 90° C. and poured into one liter of cracked ice with vigorous stirring. The mixture is stirred at room temperature for 10–15 minutes and filtered. The precipitate is recrystallized from acetonitrile to give 5,5-diphenyl-2-pyrrolidinone, M.P. 191–192.5° C.

EXAMPLE 2

4,4-diphenyl-3-butenoic acid (75 g.) is added to 75 g. of trifluoroacetic anhydride dissolved in one liter of methylene chloride. The resulting mixture is stirred at room temperature for five minutes, then, with stirring, a solution of 350 g. of phenol in 500 ml. of methylene chloride is added. The solution is heated at reflux for two hours, cooled and washed with 5% aqueous sodium bicarbonate solution, then with water, dried and concentrated to give the phenyl ester of 4,4-diphenyl-3-butenoic acid.

The above prepared ester (44 g.) is added to a mixture of 300 ml. of pyridine and 200 ml. of ethanol. To the resulting mixture is added 44 g. of hydroxylamine hydrochloride and the mixture is heated at reflux for 1.5 hours, then concentrated and 500 ml. of cold dilute hydrochloric acid and 300 ml. of water are added. The mixture is extracted with ether. The ether extract is stirred with isopropanol and warmed. The solid material is filtered off to give 4,4-diphenyl-3-butenohydroxamic acid.

4,4-diphenyl-3-butenohydroxamic acid (15.7 g.) is added with stirring to 250 ml. of concentrated sulfuric acid. The resulting mixture is stirred for five minutes at room temperature, then is added to one liter of crushed ice. The mixture is stirred for five minutes. The solid material is filtered off, dried and recrystallized from acetonitrile containing a trace of dimethylformamide, using charcoal, to give 1-hydroxy-5,5-diphenyl-2-pyrrolidinone, M.P. 221–223° C.

By the same procedure, using O-methyl-hydroxylamine hydrochloride in place of hydroxylamine hydrochloride, the product is 1-methoxy-5,5-diphenyl-2-pyrrolidinone.

EXAMPLE 3

To 2.0 g. of 1-hydroxy-5,5-diphenyl-2-pyrrolidinone in 10% aqueous sodium hydroxide solution is added 15 ml. of methyl iodide. Ethanol is added in an amount sufficient to give a clear solution and the resulting solution is stirred for 30 minutes, maintaining a basic solution by adding 10% aqueous solid hydroxide solution as required. The mixture is concentrated, then diluted with water and chilled and stirred. The solid material is filtered off, then dissolved in isopropanol. The solution is dried over magnesium sulfate while hot, then filtered hot. The filtrate is allowed to cool and the precipitate is filtered off to give 1-methoxy-5,5-diphenyl-2-pyrrolidinone.

EXAMPLE 4

By the procedure of Example 3, using the following alkyl halides in place of methyl iodide:

ethyl iodide
propyl bromide
butyl bromide the products are as follows:

1-ethyl-5,5-diphenyl-2-pyrrolidinone
5,5-diphenyl-1-propyl-2-pyrrolidinone
1-butyl-5,5-diphenyl-2-pyrrolidinone.

EXAMPLE 5

By the procedure of Example 1, using 4,5-bis(p-methoxyphenyl)-3-butenoic acid in place of 4,4-diphenyl-3-butenoic acid, the product is 5,5-bis(p-methoxyphenyl)-2-pyrrolidinone.

By the same procedure, using 4,4-bis(p-ethylphenyl)-3-butenoic acid as the starting material, the product is 5,5-bis(p-ethylphenyl)-2-pyrrolidinone.

EXAMPLE 6

By the procedure of Example 2, using 4,4-bis(p-methoxyphenyl)-3-butenoic acid as the starting material, the product is 5,5-bis(p-methoxyphenyl)-1-hydroxy-2-pyrrolidinone.

By the same procedure, using 4,4-bis(o-methoxyphenyl)-3-butenoic acid and 4,4 - bis(p-ethylphenyl)-3- butenoic acid as the starting materials, the products are, respectively, 5,5 - bis(o - methoxyphenyl)-1-hydroxy-2-pyrrolidinone and 5,5-bis(p-ethylphenyl)-1-hydroxy-2-pyrrolidinone.

EXAMPLE 7

To a mixture of 1200 ml. of dry benzene and 108 g. of sodium hydride in a 57% oil dispersion is added dropwise with stirring 25.3 g. of dry ethanol. 4-chlorobenzophenone (475 g.) is added with stirring at 15° C. The resulting mixture is stirred for 15–20 minutes, then diethyl succinate (785 g.) is added dropwise with stirring at 10° C. The mixture is stirred at room temperature for 18–19 hours, then neutralized by slowly adding glacial acetic acid. The mixture is then stirred for 30 minutes and added to water. The aqueous layer is removed and extracted with ether. The extract is combined with the organic layer and 5% aqueous sodium carbonate solution is added in portions with stirring until the solution is no longer acidic. The layers are separated and the aqueous layer is acidified with dilute hydrochloric acid. The precipitate is filtered off and recrystallized from benzene-hexane to give 4-(p-chlorophenyl)-3-ethoxycarbonyl-4-phenyl-3-butenoic acid.

To 4 - (p-chlorophenyl)-3-ethoxycarbonyl-4-phenyl-3-butenoic acid (537 g.) in three liters of glacial acetic acid is added 450 ml. of water followed by two liters of 48% hydrobromic acid and then an additional 450 ml. of water. The mixture is heated at reflux for 22 hours, then cooled and poured onto six liters of crushed ice. The precipitate is filtered off, then stirred with aqueous sodium carbonate solution until no carbon dioxide evolution is observed. The mixture is filtered. The filtrate is acidified and the solid material is filtered off and recrystallized from benzene-hexane to give 4 -(p-chlorophenyl)-4-phenyl-3-butenoic acid.

By the procedure of Example 2, using 4-chlorophenyl-4-phenyl-3-butenoic acid as the starting material, the product is 5 - (p-chlorophenyl-1-hydroxy-5-phenyl-2-pyrrolidinone.

Treating the above prepared 5-(p-chlorophenyl)-1-hydroxy-5-phenyl-2-pyrrolidinone in aqueous sodium hydroxide solution with methyl iodide according to the procedure of Example 3 gives 5-(p-chlorophenyl)-1-methoxy-5-phenyl-2-pyrrolidinone.

By the procedure of Example 1, using 4-chlorophenyl-4-phenyl-3-butenoic acid as the starting material, the product is 5-(p-chlorophenyl)-5-phenyl-2-pyrrolidinone.

EXAMPLE 8

By the procedure of Example 7, using the following benzophenones as the starting materials:

3-bromobenzophenone
4,4'-dibromobenzophenone
2,2'-dichlorobenzophenone
4,4'-dichlorobenzophenone
4,4'-difluorobenzophenone
3,4'-dimethylbenzophenone
4,4'-dibutylbenzophenone
4-propoxybenzophenone
4-butoxybenzophenone
2-trifluoromethylbenzophenone the products are:

5-(m-bromophenyl)-1-hydroxy-5-phenyl-2-pyrrolidinone
5,5-bis(p-bromophenyl)-1-hydroxy-2-pyrrolidinone
5,5-bis(o-chlorophenyl)-1-hydroxy-2-pyrrolidinone
5,5-bis(p-chlorophenyl)-1-hydroxy-2-pyrrolidinone
5,5-bis(p-fluorophenyl)-1-hydroxy-2-pyrrolidinone
1-hydroxy-5-(m-tolyl)-5-(p-tolyl)-2-pyrrolidinone
5,5-bis(p-butylphenyl)-1-hydroxy-2-pyrrolidinone
1-hydroxy-5-phenyl-5-(p-propoxyphenyl)-2-pyrrolidinone
5-(p-butoxyphenyl)-1-hydroxy-5-phenyl-2-pyrrolidinone
1-hydroxy-5-phenyl-5-(o-trifluoromethylphenyl)-2-pyrrolidinone and 5-(m-bromophenyl)-1-methoxy-5-phenyl-2-pyrrolidinone
5,5-bis(p-bromophenyl)-1-methoxy-2-pyrrolidinone
5,5-bis(o-chlorophenyl)-1-methoxy-2-pyrrolidinone
5,5-bis(p-chlorophenyl)-1-methoxy-2-pyrrolidinone
5,5-bis(p-fluorophenyl)-1-methoxy-2-pyrrolidinone
1-methoxy-5-(m-tolyl)-5-(p-tolyl)-2-pyrrolidinone
5,5-bis(p-butylphenyl)-1-methoxy-2-pyrrolidinone
1-methoxy-5-phenyl-5-(p-propoxyphenyl)-2-pyrrolidinone
5-(p-butoxyphenyl)-1-methoxy-5-phenyl-2-pyrrolidinone
1-methoxy-5-phenyl-5-(o-trifluoromethylphenyl)-2-pyrrolidinone and 5-(m-bromophenyl)-5-phenyl-2-pyrrolidinone
5,5-bis(p-bromophenyl)-2-pyrrolidinone
5,5-bis(o-chlorophenyl)-2-pyrrolidinone
5,5-bis(p-chlorophenyl)-2-pyrrolidinone
5,5-bis(p-fluorophenyl)-2-pyrrolidinone
5-(m-tolyl)-5-(p-tolyl)-2-pyrrolidinone
5,5-bis(p-butylphenyl)-2-pyrrolidinone
5-phenyl-5-(p-propoxyphenyl)-2-pyrrolidinone
5-(p-butoxyphenyl)-5-phenyl-2-pyrrolidinone
5-phenyl-5-(o-trifluoromethylphenyl)-2-pyrrolidinone.

EXAMPLE 9

Malonic acid (15.6 g.) and 34.5 g. of 2-(o-chlorophenyl)-2-phenylacetaldehyde are suspended in 500 ml. of toluene containing 1 ml. of piperidine. The mixture is heated at reflux for four hours while azeotroping water, then cooled to room temperature, washed with dilute hydrochloric acid and water, dried and concentrated. The residue is recrystallized from benzene-hexane to give 4-(o-chlorophenyl)-4-phenyl-3-butenoic acid.

By the procedure of Example 1, using 4-(o-chlorophenyl)-4-phenyl-3-butenoic acid as the starting material, the product is 5-(o-chlorophenyl)-5-phenyl-2-pyrrolidinone.

By the procedure of Example 2, using 4-(o-chlorophenyl)-4-phenyl-3-butenoic acid as the starting material, the product is 5-(o-chlorophenyl)-1-hydroxy-5-phenyl-2-pyrrolidinone.

Treating the above prepared 5-(o-chlorophenyl)-1-hydroxy - 5 - phenyl-2-pyrrolidinone in aqueous sodium hydroxide solution with methyl iodide according to the procedure of Example 3 gives 5-(o-chlorophenyl)-1-methoxy-5-phenyl-2-pyrrolidinone

What is claimed is:

1. A compound of the formula:

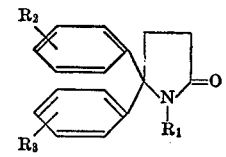

in which:

$R_1$ is hydroxy or lower alkoxy and
$R_2$ and $R_3$ are hydrogen, halogen, lower alkyl, lower alkoxy or trifluoromethyl.

2. A compound of claim 1 in which $R_1$ is lower alkoxy.
3. A compound of claim 1 in which $R_1$ is methoxy.
4. A compound of claim 1 in which $R_1$ is hydroxy and $R_2$ and $R_3$ are hydrogen.
5. A compound of claim 1 in which $R_1$ is methoxy and $R_2$ and $R_3$ are hydrogen.
6. A process of preparing compounds of the formula:

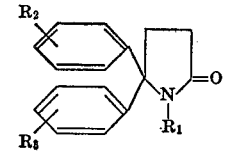

in which:

$R_1$ is hydrogen, hydroxy or lower alkoxy and
$R_2$ and $R_3$ are hydrogen, halogen, lower alkyl, lower alkoxy or trifluoromethyl which comprises cyclizing a compound of the formula:

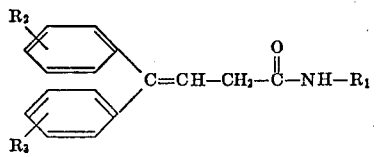

in which $R_1$, $R_2$ and $R_3$ are as defined above, by treating with acid selected from the group consisting of sulfonic acid, hydrochloric acid, trifluoroacetic acid and phosphoric acid and when $R_1$ is hydrogen, polyphosphoric acid at elevated temperature and when $R_1$ is hydroxy, concentrated sulfuric acid at room temperature.

7. A process of claim 6 in which $R_1$ is hydrogen and the cyclization is carried out by treating with polyphosphoric acid at elevated temperature.

8. A process of claim 6 in which $R_1$ is hydroxy and the cyclization is carried out by treating with concentrated sulfuric acid at room temperature.

References Cited
UNITED STATES PATENTS 2,784,200   3/1957   Frick et al. ____ 260—326.5 FL

OTHER REFERENCES

Hollins: Synthesis of Nitrogen Ring Compounds (1924) p. 69.

JOSEPH A. NARCAVAGE, Primary Examiner

U.S. Cl. X.R.

424—274